United States Patent
Hasemann

(10) Patent No.: US 7,097,702 B2
(45) Date of Patent: Aug. 29, 2006

(54) ACIDIC MONO AZO DYESTUFFS

(75) Inventor: Ludwig Hasemann, Müllheim-Niederweiler (DE)

(73) Assignee: Clariant Finance (BVI) Limited, Tortola (VG)

( * ) Notice: Subject to any disclaimer, the term of this patent is extended or adjusted under 35 U.S.C. 154(b) by 18 days.

(21) Appl. No.: 10/499,168

(22) PCT Filed: Dec. 18, 2002

(86) PCT No.: PCT/IB02/05473

§ 371 (c)(1),
(2), (4) Date: Jun. 14, 2004

(87) PCT Pub. No.: WO03/052006

PCT Pub. Date: Jun. 26, 2003

(65) Prior Publication Data

US 2005/0172856 A1    Aug. 11, 2005

(30) Foreign Application Priority Data

Dec. 19, 2001 (GB) .................. 0130309.8
Nov. 7, 2002 (GB) .................. 0225997.6

(51) Int. Cl.
C09D 11/02 (2006.01)
C09B 29/15 (2006.01)
C07C 245/08 (2006.01)
C07C 245/18 (2006.01)
G03G 5/12 (2006.01)

(52) U.S. Cl. .............. 106/31.52; 534/862; 534/878; 534/879; 428/195.1

(58) Field of Classification Search ............ 106/31.51; 534/862, 878, 879; 428/195.1
See application file for complete search history.

(56) References Cited

U.S. PATENT DOCUMENTS

| | | | |
|---|---|---|---|
| 3,211,554 A | 10/1965 | Dreyfuss | 96/99 |
| 4,162,249 A * | 7/1979 | Yelland | 534/861 |
| 4,308,542 A | 12/1981 | Maekawa et al. | |
| 4,537,598 A * | 8/1985 | Schaetzer et al. | 8/641 |
| 4,626,284 A | 12/1986 | Ohta et al. | |
| 4,703,113 A | 10/1987 | Baxter et al. | |
| 4,757,137 A * | 7/1988 | Wolfrum et al. | 534/862 |
| 4,849,770 A | 7/1989 | Koike et al. | |
| 4,935,307 A | 6/1990 | Iqbal et al. | |
| 4,956,230 A | 9/1990 | Edwards et al. | |
| 4,963,189 A | 10/1990 | Hindagolla | |
| 5,006,862 A | 4/1991 | Adamic | |
| 5,134,198 A | 7/1992 | Stofko, Jr. et al. | |
| 5,219,928 A | 6/1993 | Stofko, Jr. et al. | |
| 5,227,477 A | 7/1993 | Auerbach et al. | |
| 5,853,540 A | 12/1998 | Niemoller et al. | |
| 6,548,647 B1 | 4/2003 | Dietz et al. | 534/582 |
| 6,562,115 B1 * | 5/2003 | Baettig et al. | 106/31.51 |
| 6,764,541 B1 * | 7/2004 | Banning et al. | 106/31.29 |
| 2002/0017218 A1 | 2/2002 | Baettig et al. | 106/31.51 |
| 2003/0060608 A1 | 3/2003 | Hasemann et al. | 534/618 |
| 2004/0083924 A1 | 5/2004 | Oberholzer | 106/31.48 |
| 2004/0111813 A1 | 6/2004 | Hasemann | 8/687 |
| 2004/0127693 A1 | 7/2004 | Wald et al. | 534/630 |
| 2005/0120495 A1 * | 6/2005 | Hasemann | 8/536 |

FOREIGN PATENT DOCUMENTS

| | | |
|---|---|---|
| DE | 20 61 760 | 6/1972 |
| DE | 30 18 342 | 11/1980 |
| DE | 39 18 653 | 12/1989 |
| DE | 44 46 551 | 12/1998 |
| EP | 0 164 196 | 12/1985 |
| EP | 0 425 150 | 5/1991 |
| EP | 0 713 903 | 5/1996 |
| EP | 0 755 332 | 1/1997 |
| EP | 0 875 393 | 11/1998 |
| EP | 160 291 | 12/2001 |
| GB | 1 372 448 | 10/1974 |
| GB | 1 566 804 | 5/1980 |
| GB | 2 184 742 | 7/1987 |
| GB | 2 219 804 | 12/1989 |
| GB | 2 330 556 | 4/1999 |
| WO | WO 98/53009 | 11/1998 |
| WO | WO 99/63005 | 12/1999 |
| WO | WO 00/78876 | 12/2000 |

OTHER PUBLICATIONS

English Abstract for DE 20 61 760, Jun. 22, 1972.
English abstract for EP 0713903, May 29, 1996.

(Continued)

Primary Examiner—Helene Klemanski
(74) Attorney, Agent, or Firm—Tod A. Waldrop

(57) ABSTRACT

Disclosed are novel dyestuff for printing recording materials, especially textile fiber materials, paper and papery substrates and plastic films and plastic transparencies by the inkjet printing process of the formula (I) wherein all substituents are defined in the claims.

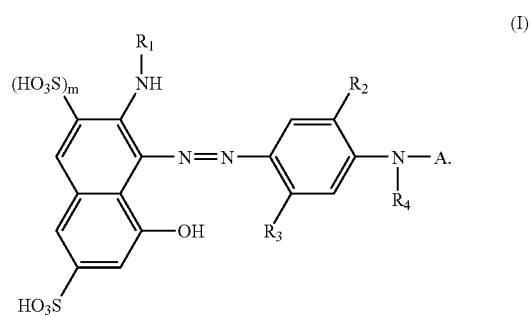

17 Claims, No Drawings

OTHER PUBLICATIONS

R.W. Kenyon, "Chemistry and Technology of Printing and Imaging Systems", Peter Gregory, Blackie Academic & Professional, Chapmann & Hall 1996, pp. 113-138, no month available.
Office Action for U.S. Appl. No. 10/221,981, mailed Jan. 14, 2004.
Office Action for U.S. Appl. No. 10/498,856, mailed May 31, 2005.

PCT Search Report for application No. PCT/IB 02/05473, mail dated Mar. 18, 2003.
PCT International Preliminary Examination Report for application No. PCT/IB 02/05473, mail dated Nov. 28, 2003.

* cited by examiner

ACIDIC MONO AZO DYESTUFFS

The invention relates to novel compounds, the use of such compounds and/or mixtures thereof as dyestuffs for printing recording materials, especially paper or papery substrates, textile fibre materials, plastic films and plastic transparencies by the inkjet printing process and also to the recording materials printed thereby.

Inkjet printing processes are becoming more and more important for industrial applications.

Inkjet printing processes are known. In what follows, the principle of inkjet printing will only be discussed very briefly. Details of this technology are described for example in the Ink-Jet-Printing section of R. W. Kenyon in "Chemistry and Technology of Printing and Imaging Systems", Peter Gregory (editor), Blackie Academic & Professional, Chapmann & Hall 1996, pages 113–138, and references cited therein.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

By additionally disposing at least one nozzle with yellow, magenta or cyan ink side by side it is possible to obtain colour reproductions in high quality. This process is known as polychromatic printing or, when three colour components are used, as trichromatic printing.

The composition of the invention can be used with all known and suitable inkjet printers for printing paper or papery substrates, textile fibre materials, plastic films and plastic transparencies. This applies not only to the use in monochromatic printing but also to polychromatic printing, especially trichromatic printing.

The composition of the ink for the inkjet printing process has to possess a suitable conductivity, sterility in storage, viscosity and surface tension to meet the specific requirements of inkjet ink. In addition, the prints on the recording materials have to have good properties and fastness.

Useful recording materials, as mentioned above, are preferably paper and papery substrates, textile fibre materials, plastic films and plastic transparencies. But glass and metal may be used as well.

Useful papers or papery substrates include all known such materials. Preference is given to papers or papery substrates coated on at least one side with a material which is particularly receptive to ink compositions. Such papers or papery materials are described inter alia in DE 3018342, DE 4446551, EP 164196 and EP 875393.

Useful textile fibre materials are in particular hydroxyl-containing fibre materials. Preference is given to cellulosic fibre materials, which consist of or comprise cellulose. Examples are natural fibre materials such as cotton, linen or hemp and regenerated fibre materials such as, for example, viscose and also lyocell.

Useful plastic films or plastic transparencies include all known such materials. Preference is given to plastic films or plastic transparencies coated on at least one side with a material which is particularly receptive to the ink compositions. Such plastic films or plastic transparencies are described inter alia in EP 755332, U.S. Pat. No. 4,935,307, U.S. Pat. No. 4,956,230, U.S. Pat. No. 5,134,198 and U.S. Pat. No. 5,219,928.

This invention provides dyestuff of formula (I)

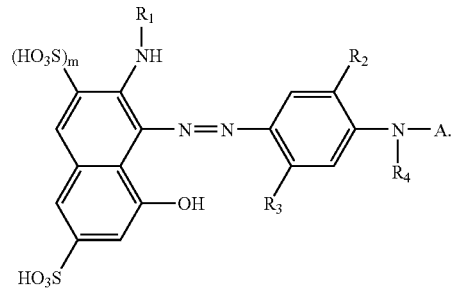

(I)

wherein
$R_1$ is H; $C_{1-4}$alkyl; substituted $C_{1-4}$alkyl; phenyl or substituted phenyl,
$R_2$ is H; $C_{1-4}$alkyl; substituted $C_{1-4}$alkyl; $C_{1-4}$alkoxy; —COOH; —COOCH$_3$; —CF$_3$; —SO$_3$H or —CN,
$R_3$ is H; $C_{1-4}$alkyl; substituted $C_{1-4}$alkyl; $C_{1-4}$alkoxy; —SO$_3$H; —CN; acetylamino; —OH; —CF$_3$ or —SO$_2$R$_5$,
wherein
$R_5$ is unsubstituted $C_{1-4}$alkyl or substituted $C_{1-4}$alkyl,
$R_4$ is H; unsubstituted $C_{1-4}$alkyl or substituted $C_{1-4}$alkyl,
A is a radical of formula

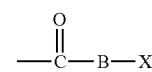

wherein
B is unsubstituted phenylene; substituted phenylene or $C_{1-4}$alkylene,
X is —SO$_3$H or —SO$_2$R$_5$ wherein
$R_5$ has the same meanings as defined above, or A is a radical of formula —SO$_2$R$_6$,
wherein
$R_6$ is unsubstituted $C_{1-4}$alkyl; substituted $C_{1-4}$alkyl; unsubstituted phenyl or substituted phenyl,
m is 0 or 1, as free acid or in salt form, as well as mixtures thereof Preferred compounds of formula (I) are characterized in that
$R_1$ is $C_{1-2}$alkyl; $C_{1-2}$alkyl which is substituted by —CN, halogen, or —COOH; phenyl or phenyl which is substituted by at least one substituent of the group consisting of $C_{1-2}$alkyl, $C_{1-2}$alkoxy, halogen, —SO$_3$H, —COOH, —OH or —CN,
$R_2$ is H; $C_{1-2}$alkyl; substituted $C_{1-2}$alkyl; $C_{1-2}$alkoxy; —COOH; —COOCH$_3$; —SO$_3$H or —CN,
$R_3$ is H; $C_{1-2}$alkyl; substituted $C_{1-2}$alkyl; $C_{1-2}$alkoxy; —SO$_3$H; —CN; acetylamine; —OH or —CF$_3$,
$R_4$ is H or $C_{1-2}$alkyl,
X is —SO$_3$H or —SO$_2$R$_5$,
wherein $R_5$ is $C_{1-2}$alkyl; substituted $C_{1-2}$alkyl; phenyl or substituted phenyl,
B is unsubstituted phenylene or $C_{1-4}$alkylene,
$R_6$ is $C_{1-2}$alkyl; unsubstituted phenyl or phenyl which is substituted by $C_{1-2}$alkyl or $C_{1-2}$alkoxy, and
m is 0 or 1.

Preferred compounds according to formula (I) have the formula (Ia)

(Ia)

wherein
R₁ signifies H; —CH₃; —CH₂CH₃; substituted C₂-alkyl; phenyl; monosubstituted phenyl or disubstituted phenyl,
R₂ signifies H; —OCH₃; —COOH or —COOCH₃,
R₃ signifies H, —SO₃H; —CN; —CF₃; —CH₃; —OCH₃ or acetylamino,
m signifies 0 or 1, and
n signifies 1, 2 or 3.

More preferred compounds according to formula (I) have the formula (Ia')

(Ia')

wherein
R₁ signifies H; —CH₃; CH₂CH₂CN; by methyl or sulfo monosubstituted phenyl or disubstituted phenyl,
R₂ signifies H; —OCH₃; —COOH or —COOCH₃,
R₃ signifies H, —SO₃H; —CN; —CF₃; —CH₃; —OCH₃,
m signifies 0 or 1, and
n signifies 1, 2 or 3.

Further preferred compounds according to formula (I) have the formula (Ib)

(Ib)

wherein
R₁ signifies H; —CH₃; —CH₂CH₃; substituted C₂-alkyl; phenyl; monosubstituted phenyl or disubstituted phenyl,
R₂ signifies H; —OCH₃; —COOH or —COOCH₃,
R₃ signifies H, —SO₃H; CN; —CF₃; —CH₃ or —OCH₃,
n signifies 1, 2 or 3
m signifies 0 or 1.

Further more preferred compounds according to formula (I) have the formula (Ib')

(Ib')

wherein
R₁ signifies H; —CH₃; CH₂CH₂CN; by methyl or sulfo monosubstituted phenyl or disubstituted phenyl,
R₃ signifies H; —SO₃H; CN; —CF₃; —CH₃ or —OCH₃,
n signifies 1, 2 or 3
m signifies 0 or 1.

Further preferred compounds according to formula (I) have the formula (Ic)

(Ic)

wherein
R₁ signifies H; —CH₃; —CH₂CH₃; substituted C₂-alkyl; phenyl; monosubstituted phenyl or disubstituted phenyl,
R₃ signifies H; —SO₃H; —CN; —CF₃; —CH₃ or —OCH₃,
R₆ signifies unsubstituted C₁₋₄alkyl; unsubstituted phenyl; monosubstituted phenyl or disubstituted phenyl,
m signifies 0 or 1.

Further more preferred compounds according to formula (I) have the formula (Ic')

(Ic')

wherein
R$_1$ signifies H; —CH$_3$; CH$_2$CH$_2$CN; by methyl or sulfo monosubstituted phenyl or disubstituted phenyl,
R$_3$ signifies H; —SO$_3$H; —CN; —CF$_3$; —CH$_3$ or —OCH$_3$,
R$_6$ signifies unsubstituted C$_{1-4}$alkyl; unsubstituted phenyl; monosubstituted phenyl or disubstituted phenyl,
m signifies 0 or 1.

A further embodiment of the present invention is the preparation of compounds of formula (I) characterized in that in a first step a compound of formula (VII)

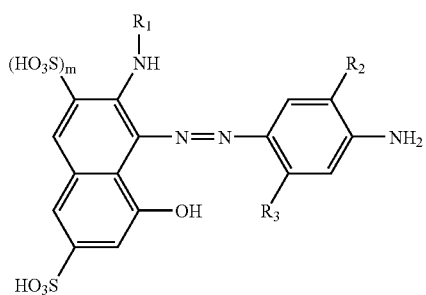
(VII)

wherein all substituents have the meanings as defined above are reacted with a compound of formula (VIIIa) or (VIIIb)

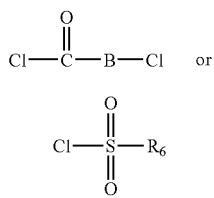
(VIIIa) or (VIIIb)

in H$_2$O/NaOH.

The reaction with the educt of formula (VIIIa) leads directly to compounds according to formula (I) wherein X is Cl; whereas the reaction with the educt of formula (VIIIb) leads directly to compounds according to formula (I) wherein A is SO$_2$R$_6$.

In a second step the product of formula (IX)

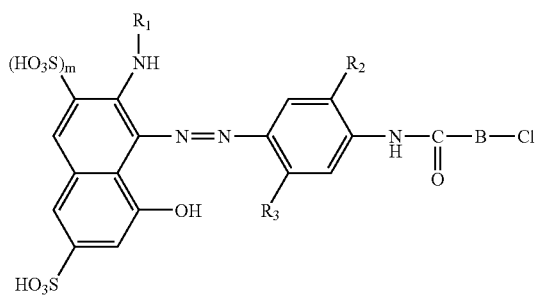
(IX)

obtained by the reaction with the educt of formula (VIIIa) is reacted with Na$_2$SO$_3$ or NaSO$_2$R$_5$ in an aqueous media to obtain a compound according to formula (I')

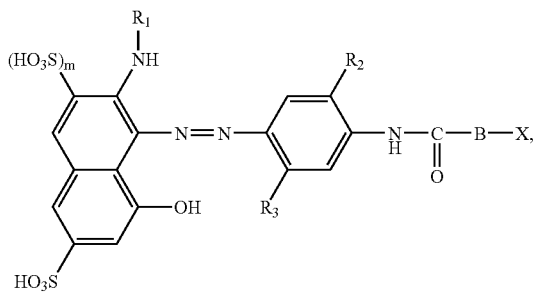
(I')

wherein all substituents have the same meanings as defined above.

In the procedure of producing the compounds the starting compound of formula (VII) can be synthesized by known processes.

In the first step of the abovementioned reaction the temperature is in the range of 0° C. to 40° C., preferably 0° C. to 25° C. and the pH is in the range of 3 to 6, preferably 4 to 5. In the second step of the abovementioned reaction the temperature is in the range of 50–90° C., preferably 60 to 80° C. and the pH is in the range of 3 to 7, preferably 4 to 6.

Any alkyl or alkylene group may be linear or branched.

Useful cations for salt formation include in particular alkali metal, alkaline earth metal as well ammonium cations. Examples of such cations are alkali metal cations, for example potassium, lithium or sodium ions and ammonium cations, e.g. mono-, di-, tri- or tetra-methyl ammonium cations or mono-, di-, tri- or tetra-ethyl ammonium cations or mono-, di- or tri-ethanol ammonium cations. The cations may be the same or different, i.e. the compounds may be in mixed salt-form.

The dyestuffs according to the invention may be used for shading other dystuffs or dyestuff mixtures. The compounds (I) according to the invention may be mixed with other colorants to match exactly the desired hue. In principle any other colorant which is compatible with the compounds according to the invention may be used for this purpose.

On the other hand the compounds according to the invention having the formula (I) may itself be used as shading component for shading other colorants.

The mixtures according to the invention itself may be used as a shading component and blended with other compatbibles dyestuff mixtures to achieve the desired shade.

Instead of blending the dystuff to the mixtures it is also possible to prepared inks as described below and mix these inks of different shades to achieve the desired colour.

The amount of shading colorants are present in this mixtures is dependent on the shade that should be achieved. For example the sghaded mixtures of dyes may comprise 50–99 wt-% of at least one compound according to formula (I) and 1–50 wt-% of at least one compound described as shading component as described and listed below, but not a compound according to formula (I).

By preference the shading component is present in an amount of 0.001 to 5% by weight, preferably 0.01 to 1% by weight, based on the total weight of the dry dye mixture.

For example the shading colorant may be selected (among others) from the group consisting of C.I. Direct Red 1, 11, 37, 62, 75, 81, 87, 89, 95, 227; C.I. Acid Red 115, 131, 144, 152, 186, 245, C.I. Pigment Red 122, 176, 184, 185 and 269.

In preferred mixtures, compounds according to formula (I) are mixed with at least one compound selected from C.I. (Colour Index) Acid Red 50, C.I. Acid Red 51, C.I. Acid Red 52, C.I. Acid Red 87, C.I. Acid Red 91, C.I. Acid Red 92, C.I. Acid Red 93, C.I. Acid Red 94, C.I. Acid Red 95, C.I. Acid Red 98 and C.I. Acid Red 289.

In further preferred mixtures, compounds according to formula (I) are mixed with at least one compound selected from C.I. Acid Red 1, C.I. Acid Red 33, C.I. Acid Red 35, C.I. Acid Red 40, C.I. Acid Red 76, C.I. Acid Red 106, C.I. Acid Red 138, C.I. Acid Red 155, C.I. Acid Red 160, C.I. Acid Red 172, C.I. Acid Red 249, C.I. Acid Red 264 and C.I. Acid Red 265.

In further preferred mixtures, compounds according to formula (I) are mixed with at least one compound selected from C.I. Acid Red 15, C.I. Acid Red 19, C.I. Acid Red 29, C.I. Acid Red 60, C.I. Acid Red 68, C.I. Acid Red 154 and C.I. Acid Red 176.

In further preferred mixtures, compounds according to formula (I) are mixed with at least one compound selected from C.I. Acid Red 30, C.I. Acid Red 34, C.I. Acid Red 37, C.I. Acid Red 42, C.I. Acid Red 54, C.I. Acid Red 57, C.I. Acid Red 231, C.I. Acid Red 266, C.I. Acid Red 301 and C.I. Acid Red 337

Especially preferred mixture comprises a compound according to formula (I) and C.I. Acid Red 52 and/or C.I. Acid Red 289 which have the following formulae

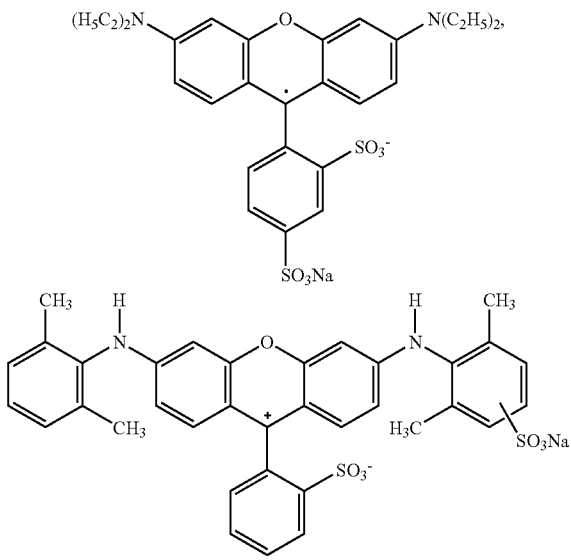

respectively.

It is possible to use the dyestuff (I) without any further dyestuff in the composition Ink jet printing compositions according the present invention.

A further embodiment of the present invention relates to a composition for printing recording materials, preferably paper and papery substrates, textile fibre materials, plastic films and plastic transparencies by the inkjet printing process, comprising
1) the dye of the formula (I) as defined above and
2) water or a medium including a mixture of water and an organic solvent, an anhydrous organic solvent or a solid having a low melting point, The inkjet printing composition may optionally comprise further additives.

A further embodiment of the present invention relates to a inkjet printing composition for printing recording materials, preferably paper and papery substrates, textile fibre materials, plastic films and plastic transparencies, comprising
1) a mixture of dyestuffs as defined above and
2) water or a medium including a mixture of water and an organic solvent, an anhydrous organic solvent or a solid having a low melting point, The inkjet printing composition may optionally comprise further additives.

A further embodiment of the invention relates to the use of the above mentioned compositions for the ink-jet printing process.

The dyes of the formula (I) used in the inks should preferably be low in salt, i.e. have a total salt content of less than 0.5% by weight, based on the weight of the dyes. Dyes having higher salt contents (owing to their preparation and/or the subsequent addition of extenders) may be desalted, for example by means of membrane separation processes, such as ultrafiltration, reverse osmosis or dialysis.

The inks preferably include a total amount of dyes which is in the range from 0.5 to 35% by weight, preferably in the range from 1 to 35% by weight, more preferably in the range from 2 to 30% by weight, most preferably in the range from 2.5 to 20% by weight, based on the total weight of the ink.

The inks include 99.5–65% by weight, preferably 99–65% by weight, more preferably 98–70% by weight, most preferably 97.5–80% by weight, of an abovementioned medium 2), which includes a mixture of water and an organic solvent, an anhydrous organic solvent or a solid having a low melting point.

When said medium 2) is a mixture including water and an organic solvent or an anhydrous organic solvent, the dye mixtures comprising at least one compounds of formula (I) are preferably completely dissolved in this medium.

Preferably the dye mixtures comprising at least one compounds of formula (I) have a solubility of not less than 2.5% by weight in this medium 2) at 20° C.

When the ink composition of the invention is used for printing paper or papery substrates, the inks are preferably used together with the following compositions. When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20.

It is preferable for the organic solvent, which is included in the mixture with water to be a water-soluble solvent or a mixture of various water-soluble solvents. Preferred water-soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide, or dimethylacetamide; ketones and keto alcohols, preferably acetone, methyl ethyl ketone, cyclohexanone and diacetone alcohol; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol and thiodiglycol and oligo- and poly-alkylene glycols, preferably diethylene glycol, triethylene glycol, 1,2-propylenglycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy)ethanol, 2-[2-(2-methoxyethoxy)ethoxy]-ethanol, 2-[2-(2-ethoxyethoxy)ethoxy]ethanol, diethylenglycol-mono-n-butylether, ethylene glycol monoallyl ether and polyoxyethylenalkylether (for example Emulgen 66 of KAO Corp. (Emulgen is a trade mark of the Kao Corp.)); alkanolamines, preferably 2-diethylamine-1-ethanol, 3-dimethylamine-1-propanol, 3-diethylamine-1-propanol, 2-(2-aminoethoxy)ethanol, 2-(2-dimethylamino-ethoxy)-ethanol, 2-(2-diethylaminoethoxy)ethanol, mono-, di-, triethanolamine, monoglycolamines and polyglycolamines, which may be obtained by reaction of ammonia, alkyl- or hydroxyalkylamines like methylamine, ethylamine, dimethylamine, diethylamine, mono-, di- and triethanolamines with alkyleneoxides for example ethylenoxide, 1,2-propylenoxide, 1,2-butylenoxide or 2,3-butylenoxide in suitable ratios as described in DE2061760A, preferably diethylenglycolamine, triethylenglycolamin, Bis-diethylenglycolamin, polyoxyethylen-(6)-triethanolamine, polyoxyethylen-(9)-triethanolamine, o-(2-aminoethyl)-polyethylenglycol 750, o,o-Bis-(2-aminopropyl)-polyethylenglycol 500, 800, 1900, 2000, o,o'-Bis-(3-aminopropyl)-polyethylenglycol 1500, cyclic amides, preferably 2-pyrrolidone, N-methyl-2-pyrrolidone, N-ethyl-2-pyrrolidone, N-(2-hydroxy)ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per 2) includes water and at least 2 or more, more preferably 2 to 8, water-soluble organic solvents.

Particularly preferred water-soluble solvents are cyclic amides, particularly 2-pyrrolidone, N-methyl-2-pyrrolidone and N-ethyl-2-pyrrolidone; N-(2-hydroxy)ethyl-2-pyrrolidone, $C_{1-6}$-alcohols, preferably n-propanol, cyclohexanol, diols, preferably 1,5-pentanediol, ethylene glycol, thiodiglycol, diethylene glycol, triethylene glycol and 1,2-propyleneglycol, triols, preferably glycerol; and mono-$C_{1-4}$-alkyl and $C_{1-4}$-alkyl ethers of diols, more preferably mono-$C_{1-4}$-alkyl ethers of diols possessing 2 to 12 carbon atoms, particularly preferably 2-[2-(2-methoxyethoxy)-ethoxy]-ethanol, diethylenglycol-mono-n-butylether, (for example Emulgen 66 of KAO Corp. (Emulgen is a trade mark of the Kao Corp.)), 2-diethylamine-1-ethanol, 3-dimethylamine-1-propanol, 3-diethylamine-1-propanol, 2-(2-diethylaminoethoxy)-ethanol, triethanolamine, diethylenglycolamin, polyglycolamines, preferably polyoyxethylen-(6)-triethanolamin, polyoxyethylen-(9)-triethanolamine, o-(2-aminoethyl)-polyethylen 750, o,o-bis-(2-aminopropyl)-poyethylen 500 and o,o-bis-(3-aminopropyl)-polyethylenglycol 1500.

A preferred medium as per 2) comprises (a) 75 to 95 parts by weight of water and (b) 25 to 5 parts of one or more of the watersoluble solvents.

wherein the parts are by weight and all parts of (a) and (b) add up to 100.

Examples of further useful ink compositions including water and one or more organic solvents are found in the Patent Specifications U.S. Pat. No. 4,963,189, U.S. Pat. No. 4,703,113, U.S. Pat. No. 4,626,284 and EP 425150A.

When the medium as per 2) includes an anhydrous (i.e. less than 1% by weight of water) organic solvent, this solvent will have a boiling point of 30 to 200° C., more preferably of 40–150° C., particularly preferably of 50–125° C.

The organic solvent can be water-insoluble, water-soluble or mixtures of such solvents.

Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$; and ethers, preferably diethyl ether; and mixtures thereof.

When the liquid medium as per 2) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per 2) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 125° C. Useful low-melting solids include long-chain fatty acids or alcohols, preferably those having a $C_{18-24}$-carbon chain, and sulphonamides.

The ink composition of the invention may further include as auxiliaries additional components which are normally used in inkjet inks, for example viscosity improvers, surface tension improvers, biocides, corrosion inhibitors, levelling agents, drying agents, humefactants, ink penetration additives, light stabilizers, UV absorbers, optical brighteners, coagulation reducers, ionic or nonionic surfactants, conducting salts and pH buffers.

These auxiliaries are preferably added in an amount of 0–5% by weight.

To prevent precipitation in the ink compositions of the invention, the dyes used have to be purified clean. This can be done with commonly known purifying methods.

When printing textile fibre materials, useful additives, as well as the solvents, include water-soluble nonionic cellulose ethers or alginates.

The preferred material is paper. The paper may be plain or treated. Preference is given to ink compositions having a viscosity of 1 to 40 mPa·s, especially 5 to 40 mPa·s, preferably 10 to 40 mPa·s. Ink compositions having a viscosity of 10 to 35 mPa·s are particularly preferred.

Preference is given to ink compositions having a surface tension of 15–73 mN/m, especially 20–65 mN/m, particularly preferably 30–50 mN/m.

Preference is given to ink compositions having a conductivity of 0.1–100 mS/cm, especially 0.5–70 mS/cm, particularly preferably 1.0–60 mS/cm.

The inks may further include buffer substances, for example borax, borate or citrate. Examples are sodium borate, sodium tetraborate and sodium citrate.

They are used in particular in amounts of 0.1 to 3% by weight, preferably 0.1 to 1% by weight, based on the total weight of the ink, to set a pH of for example 5 to 9, especially 6 to 8. A citrate buffer is preferred in the case of alginatic inks.

The inks may further include customary additives, for example foam suppressants or especially fungal and/or bacterial growth inhibitors. These are customarily used in amounts of 0.01 to 1% by weight, based on the total weight of the ink.

The printing inks and also the dye mixtures comprise at least the compound of formula (I).

The prints obtainable by the process of the invention have good general fastnesses, a good lightfastness and also sharp contours and a high colour strength. The inks provide prints of high optical density. Especially good brilliance together with a good light fastness is achieved with the dyes according to the invention.

The printing inks used are notable for good stability and good viscosity properties. The recording fluids of the invention have viscosity and surface tension values which are within the ranges suitable for the ink-jet processes. The viscosity remains virtually unchanged even in the event of high shearing forces occurring during printing.

Recording fluids according to the invention in storage are not prone to the formation of precipitates that leads to fuzzy prints or nozzle cloggage.

A further aspect of the present invention is the use of the printing ink in trichromatic printing. Trichromatic printing is a very large application for all recording materials. This form of printing is normally carried out with a yellow, red and blue ink composition. Furthermore, the magenta dye mixtures of the invention may be used as an ink set in combination with black, yellow and/or cyan recording fluids.

This invention further provides recording materials, which have been printed with a composition according to the invention.

Moreover, the dye mixtures of the invention are useful as colorants in the electrophotographic toners and developers, for example one- and two-component powder toners, magnetic toners, liquid toners, polymerization toners and other specialty toners.

Typical toner binders are addition polymerization, polyaddition and polycondensation resins, such as styrene, styrene-acrylate, styrene-butadiene, acrylate, polyester, phenolic and epoxy resins, polysulfones, polyurethanes, individually or in combination, and also polyethylene and polypropylene, in or to which further ingredients, such as charge control agents, waxes or flow agents, may be present or added subsequently. Dye mixtures according to the invention are further useful as colorants in powders and powder coating materials, especially triboelectrically or electrostatically sprayed powder coating materials, which are used to coat the surfaces of articles made for example of metal, wood, plastic, glass, ceramic, concrete, textile material, paper or rubber. Powder coating resins employed are typically epoxy resins, carboxyl- and hydroxyl-containing polyester resins, polyurethane resins and acrylic resins together with customary curing agents. Combinations of resins are also used. For instance, epoxy resins are frequently used in combination with carboxyl- and hydroxyl-containing polyester resins.

The dye mixtures of the invention are also useful as colorants for color filters, for additive as well as subtractive color generation (P. Gregory "Topics in Applied Chemistry: High Technology Applications of Organic Colorants" Plenum Press, New York 1991, page 15–25), and also as colorants in electronic inks for electronic newspapers.

The examples hereinbelow illustrate the invention. Temperatures are in degrees Celsius; parts and percentages are by weight, unless otherwise stated.

EXAMPLES OF INK COMPOSITIONS

A preferred ink composition according to the invention comprises

| | |
|---|---|
| 0.5–35 parts | of a of formula (I), |
| 65–99.5 parts | of water or a medium including a mixture of water and an organic solvent, an anhydrous organic solvent or a solid having a low melting point and optionally |
| 0–5 parts | of one or more additives. |

A more preferred ink composition according to the invention comprises

| | |
|---|---|
| 1–20 parts | of a of formula (I), |
| 80–99 parts | of water or a medium including a mixture of water and an organic solvent, an anhydrous organic solvent or a solid having a low melting point and optionally |
| 0–5 parts | of one or more additives. |

A particularly preferred ink composition according to the invention comprises

| | |
|---|---|
| 1–5 parts | of a of formula (I), |
| 95–99 parts | of water or a medium including a mixture of water and an organic solvent, an anhydrous organic solvent or a solid having a low melting point and optionally |
| 0–5 parts | of one or more additives. |

A more preferred ink composition according to the invention comprises

| | |
|---|---|
| 0.5–35 parts | of a dye mixtures comprising at least one compound of formula (I) and at least C.I. Acid Red 52 or C.I. Acid Red 289, and |
| 65–99.5 parts | of water or a medium including a mixture of water and an organic solvent, an anhydrous organic solvent or a solid having a low melting point and optionally |
| 0–5 parts | of one or more additives. |

A particularly preferred ink composition according to the invention comprises

| | |
|---|---|
| 1–20 parts | of a dye mixtures comprising at least one compound of formula (I) and at least C.I. Acid Red 52 or C.I. Acid Red 289, and |
| 80–99 parts | of water or a medium including a mixture of water and an organic solvent, an anhydrous organic solvent or a solid having a low melting point and optionally |
| 0–5 parts | of one or more additives. |

A further preferred ink composition according to the invention comprises

| | |
|---|---|
| 1–5 parts | of a dye mixtures comprising at least one compound of formula (I) and at least C.I. Acid Red 52 or C.I. Acid Red 289, and |
| 95–99 parts | of water or a medium including a mixture of water and an organic solvent, an anhydrous organic solvent or a solid having a low melting point and optionally |
| 0–5 parts | of one or more additives. |

The sum total of all the parts of the abovementioned compositions according to the invention is 100 parts.

The above mentioned composition is preferably prepared by heating the medium to 40° C. and then adding a dye mixtures comprising at least one compound of formula (I) and at least C.I. Acid Red 52 or C.I. Acid Red 289. The composition is then cooled down to room temperature.

This ink composition is preferably used for printing papers or papery substrates.

The following Examples further serve to illustrate the invention, without restricting the scope of protection to these Examples. In the Examples all parts and all percentages are by weight, and the temperatures given are in degrees Celsius, unless indicated to the contrary.

Example 1 a) Diazotization and Coupling 46 g (0.2 mol) 1-acetylamino-4-aminobenzene-3-sulfonic acid are diazotized indirectly in 300 ml water. The reaction solution is added to a suspension of 47.8 g 2-amino-8-hydroxynaphthalin-6-sulfonic acid in 500 ml water at 5° C. The pH-value is adjusted to 2.5–4 by adding sodiumacetate-solution. After the termination of this reaction the compound of formula (IX)

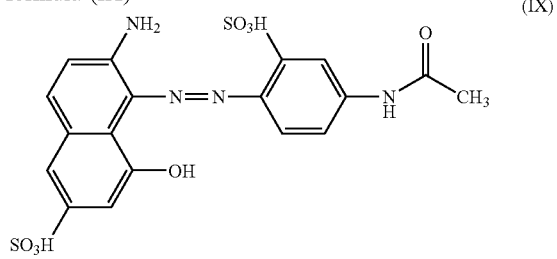

(IX)

is filtered off.

b) Saponification 252 g of the moist presscake of the compound (IX) obtained by a) is added to 600 ml water. 5 volume percent (vl-%) of solid sodium hydroxide is added and the reaction mixture is heated to 70° C. for a period of 3 h.

After the termination of the reaction the product is salted out and filtered off. A compound of formula (X)

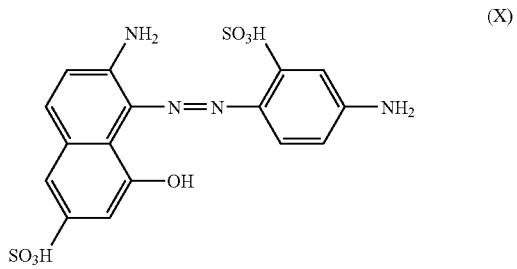

(X)

is obtained.

c) Condensation 138 g of the moist presscake of the compound of formula (X) is added to 700 ml of water and the pH-value is adjusted to 4.5.

28 g 3-chloropropionic acid chloride is added slowly during a period of 15 min at a pH-value of 3.5–4.5 and a temperature of 5–12° C. After 2 hours a compound of formula (XI)

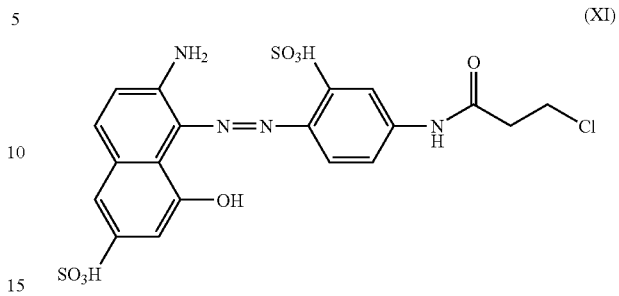

(XI)

is salted out and filtered off.

d) Substitution 170 g of the moist presscake consisting of the compound of formula (XI) is added to 700 ml of water and the pH-value is adjusted to 5.50 g of sodium sulfite are added and the reaction solution is stirred for 2 h at a temperature of 70° C.

The dyestuff of formula (XII)

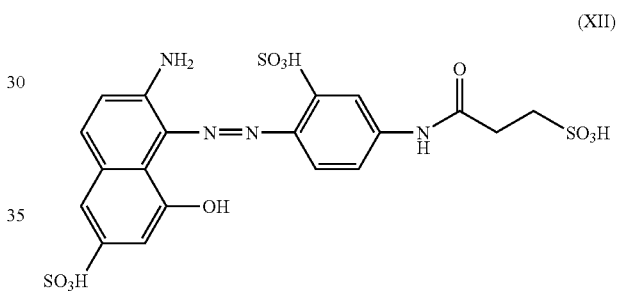

(XII)

with a $\lambda_{max}$ of 514.7 nm (measured in 2 wt-% sodium acetate in $H_2O$ at room temperature), is obtained by salting-out and a subsequent filtration.

Example 2 a) Diazotization and Coupling 46 g 2-amino-5-nitro-benzotrifluoride are diazotized in 250 ml water at 5° C. The reaction solution is added to a suspension of 31.9 g 2-amino-8-hydroxynaphthalin-3,6-disulfonic acid in 300 ml water at 5° C. The pH-value is adjusted to 2.5–3 by adding sodiumacetate-solution. After the termination of this reaction the compound of formula (XIII)

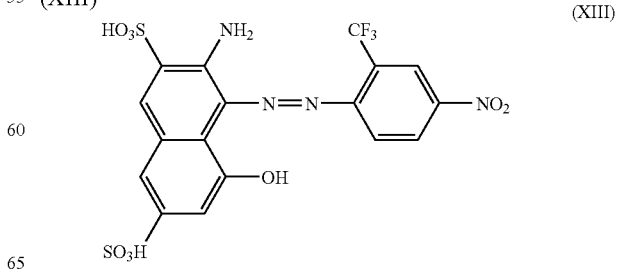

(XIII)

is filtered off.

b) Reduction 143 g of the moist presscake of the compound (XIII) obtained by a) is added to 500 ml water. Sodium sulfide is added at a temperature of 20° C. After the termination of the reaction, the solution is acidified and the product is salted out and filtered off. A compound of formula (XIV)

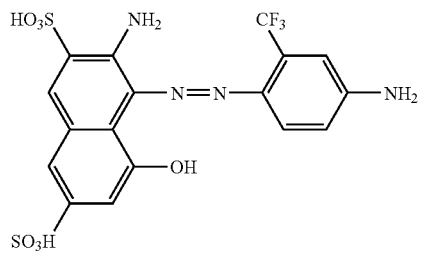

(XIV)

is obtained.

c) Condensation 143 g of the moist presscake consisting of the compound of formula (XIV) is added to 600 ml of water and the pH-value is adjusted to 4.5.

5 ml monochloroacetyl chloride is added slowly at a pH-value of 4.5–5. The pH-value is controlled by the addition of sodium hydroxide. After 2 h a compound of formula (XV)

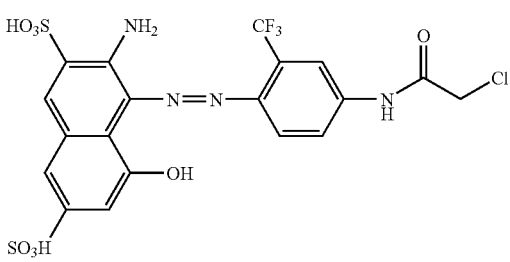

(XV)

is salted out and filtered off.

d) Substitution 91 g of the moist presscake consisting of the compound of formula (XV) is added to 500 ml of water and the pH-value is adjusted to 5.25 g of sodium sulfite are added and the reaction solution is stirred for 1 h at a temperature of 70° C.

The dyestuff of formula (XVI)

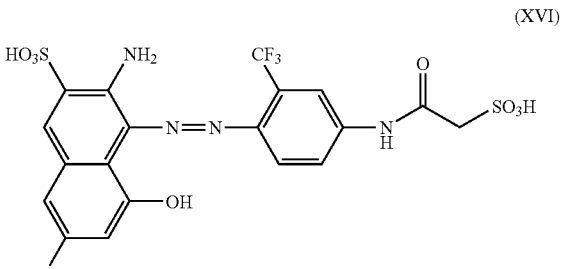

(XVI)

with a $\lambda_{max}$ of 514.3 nm (measured in 2 wt-% sodium acetate in $H_2O$ at room temperature), is obtained by salting-out and a subsequent filtration.

Example 3 a) Condensation 138 g of the moist presscake consisting of the compound of formula (X) is added to 700 ml of water and the pH-value is adjusted to 4.5.

30 g $ClSO_2CH_2CH_3$ is added slowly during a period of 15 min at a pH-value of 4.5. After 2 hours a compound of formula (XVII)

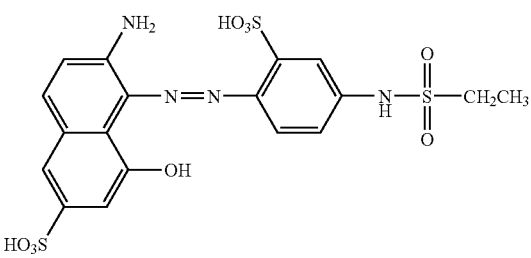

(XVII)

with a $\lambda_{max}$ of 513.0 nm (measured in 2 wt-% sodium acetate in $H_2O$ at room temperature), is salted out and filtered off.

TABLE 1

Examples 4–42

Analogously to Example 1 the following examples are obtained.

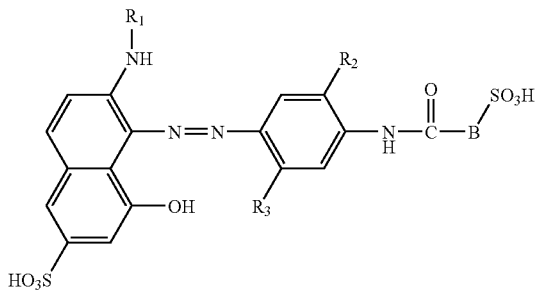

| Exp. | R₁ | R₂ | R₃ | B | $\lambda_{max}$* [nm] |
|---|---|---|---|---|---|
| 4 | H | H | —SO₃H | —CH₂— | 515.2 |
| 5 | H | H | —CN | —CH₂— | 512.1 |
| 6 | H | H | —CN | —CH₂CH₂— | 516.1 |
| 7 | H | H | —CF₃ | —CH₂— | 508.7 |
| 8 | H | H | —CF₃ | —CH₂CH₂— | 514.3 |
| 9 | H | H | —CH₃ | —CH₂— | 498.0 |
| 10 | H | H | —CH₃ | —CH₂CH₂— | 501.2 |
| 11 | H | H | —OCH₃ | —CH₂— | 504.7 |
| 12 | H | H | —OCH₃ | —CH₂CH₂— | 508.3 |
| 13 | H | —OCH₃ | H | —CH₂— | 503.1 |
| 14 | H | —OCH₃ | H | —CH₂CH₂— | 505.2 |
| 15 | H | —COOH | H | —CH₂— | 514.0 |
| 16 | H | —COOH | H | —CH₂CH₂— | 512.9 |
| 17 | H | —COOCH₃ | H | —CH₂— | 510.1 |
| 18 | H | —COOCH₃ | H | —CH₂CH₂— | 511.3 |
| 19 | —CH₃ | H | —SO₃H | —CH₂— | 526.8 |
| 20 | —CH₃ | H | —SO₃H | —CH₂CH₂— | 528.3 |
| 21 | —CH₃ | H | —CN | —CH₂— | 521.7 |
| 22 | —CH₃ | H | —CN | —CH₂CH₂— | 522.4 |
| 23 | —CH₃ | H | —CF₃ | —CH₂— | 504.1 |
| 24 | —CH₃ | H | —CF₃ | —CH₂CH₂— | 504.4 |
| 25 | —CH₃ | H | —CH₃ | —CH₂— | 506.8 |
| 26 | —CH₃ | H | —CH₃ | —CH₂CH₂— | 509.2 |
| 27 | —CH₃ | H | —OCH₃ | —CH₂— | 517.1 |
| 28 | —CH₃ | H | —OCH₃ | —CH₂CH₂— | 516.3 |
| 29 | —CH₃ | —OCH₃ | H | —CH₂— | 510.7 |
| 30 | —CH₃ | —OCH₃ | H | —CH₂CH₂— | 512.3 |
| 31 | —CH₃ | —COOH | H | —CH₂— | 520.9 |
| 32 | —CH₃ | —COOH | H | —CH₂CH₂— | 524.7 |
| 33 | —CH₃ | —COOCH₃ | H | —CH₂— | 519.6 |
| 34 | —CH₃ | —COOCH₃ | H | —CH₂CH₂— | 521.5 |
| 35 | —CH₂CH₂CN | H | —SO₃H | —CH₂— | 514.0 |
| 36 | —CH₂CH₂CN | H | —SO₃H | —CH₂CH₂— | 512.9 |
| 37 | phenyl | H | —SO₃H | —CH₂— | 536.1 |
| 38 | phenyl | H | —SO₃H | —CH₂CH₂— | 535.7 |
| 39 | m-sulfo-phenyl | H | —SO₃H | —CH₂ | 538.2 |
| 40 | m-sulfo-phenyl | H | —SO₃H | —CH₂CH₂— | 539.4 |
| 41 | xylyl | H | —SO₃H | —CH₂— | 526.1 |
| 42 | xylyl | H | —SO₃H | —CH₂CH₂— | 526.4 |

*$\lambda_{max}$-values are measured in 2 wt % sodium acetate in H₂O at room temperature)

TABLE 2

Examples 43–81

Analogously to Example 2 the following examples are obtained.

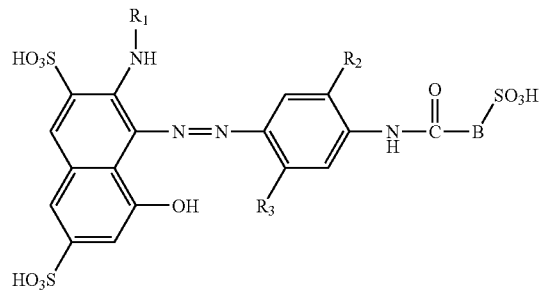

| Exp. | $R_1$ | $R_2$ | $R_3$ | B | $\lambda_{max}$* [nm] |
|---|---|---|---|---|---|
| 43 | H | H | —$SO_3H$ | —$CH_2$— | 520.4 |
| 44 | H | H | —$SO_3H$ | —$CH_2CH_2$— | 521.0 |
| 45 | H | H | —CN | —$CH_2$— | 519.3 |
| 46 | H | H | —CN | —$CH_2CH_2$— | 521.5 |
| 47 | H | H | —$CF_3$ | —$CH_2CH_2$— | 513.8 |
| 48 | H | H | —$CH_3$ | —$CH_2$— | 504.2 |
| 49 | H | H | —$CH_3$ | —$CH_2CH_2$— | 506.0 |
| 50 | H | H | —$OCH_3$ | —$CH_2$— | 512.6 |
| 51 | H | H | —$OCH_3$ | —$CH_2CH_2$— | 512.1 |
| 52 | H | —$OCH_3$ | H | —$CH_2$— | 509.4 |
| 53 | H | —$OCH_3$ | H | —$CH_2CH_2$— | 510.3 |
| 54 | H | —COOH | H | —$CH_2$— | 5224.7 |
| 55 | H | —COOH | H | —$CH_2CH_2$— | 524.1 |
| 56 | H | —$COOCH_3$ | H | —$CH_2$— | 517.6 |
| 57 | H | —$COOCH_3$ | H | —$CH_2CH_2$— | 520.1 |
| 58 | —$CH_3$ | H | —$SO_3H$ | —$CH_2$— | 534.3 |
| 59 | —$CH_3$ | H | —$SO_3H$ | —$CH_2CH_2$— | 535.0 |
| 60 | —$CH_3$ | H | —CN | —$CH_2$— | 531.7 |
| 61 | —$CH_3$ | H | —CN | —$CH_2CH_2$— | 533.5 |
| 62 | —$CH_3$ | H | —$CF_3$ | —$CH_2$— | 514.7 |
| 63 | —$CH_3$ | H | —$CF_3$ | —$CH_2CH_2$— | 520.4 |
| 64 | —$CH_3$ | H | —$CH_3$ | —$CH_2$— | 517.2 |
| 65 | —$CH_3$ | H | —$CH_3$ | —$CH_2CH_2$— | 518.7 |
| 66 | —$CH_3$ | H | —$OCH_3$ | —$CH_2$— | 526.1 |
| 67 | —$CH_3$ | H | —$OCH_3$ | —$CH_2CH_2$— | 527.5 |
| 68 | —$CH_3$ | —$OCH_3$ | H | —$CH_2$— | 519.9 |
| 69 | —$CH_3$ | —$OCH_3$ | H | —$CH_2CH_2$— | 522.4 |
| 70 | —$CH_3$ | —COOH | H | —$CH_2$— | 533.1 |
| 71 | —$CH_3$ | —COOH | H | —$CH_2CH_2$— | 536.3 |
| 72 | —$CH_3$ | —$COOCH_3$ | H | —$CH_2$— | 531.6 |
| 73 | —$CH_3$ | —$COOCH_3$ | H | —$CH_2CH_2$— | 531.1 |
| 74 | —$CH_2CH_2CN$ | H | —$SO_3H$ | —$CH_2$— | 519.8 |
| 75 | —$CH_2CH_2CN$ | H | —$SO_3H$ | —$CH_2CH_2$— | 521.4 |
| 76 | phenyl | H | —$SO_3H$ | —$CH_2$— | 540.6 |
| 77 | phenyl | H | —$SO_3H$ | —$CH_2CH_2$— | 541.3 |
| 78 | m-sulfo-phenyl | H | —$SO_3H$ | —$CH_2$— | 543.2 |
| 79 | m-sulfo-phenyl | H | —$SO_3H$ | —$CH_2CH_2$— | 544.1 |
| 80 | xylyl | H | —$SO_3H$ | —$CH_2$— | 534.1 |
| 81 | xylyl | H | —$SO_3H$ | —$CH_2CH_2$— | 535.7 |

*$\lambda_{max}$-values are measured in 2 wt % sodium acetate in $H_2O$ at room temperature)

TABLE 3

Examples 82–100

Analogously to Example 3 the following examples are obtained.

Structure: Naphthalene with $(HO_3S)_m$, $NHR_1$, $OH$, $HO_3S$ groups, connected via $-N=N-$ to a phenyl ring bearing $R_3$ and $-NH-SO_2CH_2CH_3$.

| Exp. | m | $R_1$ | $R_3$ | $\lambda_{max}$* [nm] |
|---|---|---|---|---|
| 82 | 0 | H | —CH₃ | 500.3 |
| 83 | 0 | H | —OCH₃ | 5021 |
| 84 | 0 | H | —CN | 515.8 |
| 85 | 0 | H | —CF₃ | 512.4 |
| 86 | 0 | —CF₃ | —SO₃H | 531.3 |
| 87 | 0 | phenyl | —SO₃H | 532.4 |
| 88 | 0 | m-sulfo-phenyl | —SO₃H | 534.1 |
| 89 | 0 | xylyl | —SO₃H | 522.1 |
| 90 | 1 | H | —SO₃H | 520.5 |
| 91 | 1 | H | —CN | 521.5 |
| 92 | 1 | H | —CH₃ | 502.6 |
| 93 | 1 | H | —OCH₃ | 508.8 |
| 94 | 1 | H | —CF₃ | 514.2 |
| 95 | 1 | —CH₃ | —SO₃H | 526.4 |
| 96 | 1 | —CH₃ | —CN | 527.0 |
| 97 | 1 | —CH₃ | —CH₃ | 520.9 |
| 98 | 1 | —CH₃ | —OCH₃ | 522.7 |
| 99 | 1 | phenyl | —SO₃H | 541.7 |
| 100 | 1 | xylyl | —SO₃H | 528.3 |

*$\lambda_{max}$-values are measured in 2 wt % sodium acetate in H₂O at room temperature)

TABLE 4

Examples 101–140

Analogously to Example 1 the following examples are obtained.

Structure: Naphthalene with $(HO_3S)_m$, $NHR_1$, $OH$, $HO_3S$ groups, connected via $-N=N-$ to a phenyl ring bearing $R_3$ and $-NH-C(=O)-B-SO_2CH_2CH_3$.

| Exp. | m | $R_1$ | $R_3$ | B | $\lambda_{max}$* [nm] |
|---|---|---|---|---|---|
| 101 | 0 | H | —SO₃H | —CH₂— | 512.8 |
| 102 | 0 | H | —SO₃H | —CH₂CH₂— | 513.3 |
| 103 | 0 | H | —CH₃ | —CH₂— | 507.6 |
| 104 | 0 | H | —CH₃ | —CH₂CH₂— | 506.4 |
| 105 | 0 | H | —OCH₃ | —CH₂— | 508.8 |
| 106 | 0 | H | 1'OCH₃ | —CH₂CH₂— | 509.1 |
| 107 | 0 | H | —CF₃ | —CH₂— | 511.3 |
| 108 | 0 | H | —CF₃ | —CH₂CH₂— | 510.1 |
| 109 | 0 | —CH₃ | —SO₃H | —CH₂— | 524.2 |
| 110 | 0 | —CH₃ | —SO₃H | —CH₂CH₂— | 526.5 |
| 111 | 0 | —CH₃ | —CH₃ | —CH₂— | 512.4 |
| 112 | 0 | —CH₃ | —CH₃ | —CH₂CH₂— | 511.7 |
| 113 | 0 | —CH₃ | —OCH₃ | —CH₂— | 514.3 |
| 114 | 0 | —CH₃ | —OCH₃ | —CH₂CH₂— | 514.9 |
| 115 | 0 | —CH₃ | —CF₃ | —CH₂— | 514.6 |
| 116 | 0 | —CH₃ | —CF₃ | —CH₂CH₂— | 515.3 |
| 117 | 0 | phenyl | —SO₃H | —CH₂— | 531.7 |
| 118 | 0 | phenyl | —SO₃H | —CH₂CH₂— | 533.0 |
| 119 | 0 | xylyl | —SO₃H | —CH₂— | 523.8 |
| 120 | 0 | xylyl | —SO₃H | —CH₂CH₂— | 524.2 |
| 121 | 1 | H | —SO₃H | —CH₂— | 518.9 |
| 122 | 1 | H | —SO₃H | —CH₂CH₂— | 519.4 |
| 123 | 1 | H | —CH₃ | —CH₂— | 511.6 |
| 124 | 1 | H | —CH₃ | —CH₂CH₂— | 511.1 |
| 125 | 1 | H | —OCH₃ | —CH₂— | 513.0 |
| 126 | 1 | H | —OCH₃ | —CH₂CH₂— | 513.4 |
| 127 | 1 | H | —CF₃ | —CH₂— | 515.2 |
| 128 | 1 | H | —CF₃ | —CH₂CH₂— | 517.3 |
| 129 | 1 | —CH₃ | —SO₃H | —CH₂— | 531.6 |
| 130 | 1 | —CH₃ | —SO₃H | —CH₂CH₂— | 533.7 |
| 131 | 1 | —CH₃ | —CH₃ | —CH₂— | 522.4 |
| 132 | 1 | —CH₃ | —CH₃ | —CH₂CH₂— | 524.0 |
| 133 | 1 | —CH₃ | —OCH₃ | —CH₂— | 526.3 |
| 134 | 1 | —CH₃ | —OCH₃ | —CH₂CH₂— | 527.5 |
| 135 | 1 | —CH₃ | —CF₃ | —CH₂— | 523.7 |
| 136 | 1 | —CH₃ | —CF₃ | —CH₂CH₂— | 525.7 |
| 137 | 1 | phenyl | —SO₃H | —CH₂— | 538.9 |
| 138 | 1 | phenyl | —SO₃H | —CH₂CH₂— | 541.6 |
| 139 | 1 | xylyl | —SO₃H | —CH₂— | 533.2 |
| 140 | 1 | xylyl | —SO₃H | —CH₂CH₂— | 535.1 |

*$\lambda_{max}$-values are measured in 2 wt-% sodium acetate in H₂O at room temperature)

Dyestuff Mixtures

The following dyestuff mixtures are used to formulate a composition for printing recording materials as described above. Such a composition comprises 1) a dyestuff or a mixture of dyestuffs as defined above and
2) water or a medium including a mixture of water and an organic solvent, an anhydrous organic solvent or a solid having a low melting point, and
3) optionally further additives.

Example 141

Dyestuff Mixture 1

| | |
|---|---|
| 90 wt-% | of the Example 1 and |
| 10 wt-% | of C.I. Acid Red 52. |

This mixture is used to formulate a composition comprising

| | |
|---|---|
| 2.5 wt-% | of Example 141 (dyestuff Mixture 1) |
| 15 wt-% | of N-methyl-pyrrolidone |
| 82.5 wt-% | of water. |

This mixture is further used to formulate a composition comprising

| | |
|---|---|
| 2.5 wt-% | of Example 141 (dyestuff Mixture 1) |
| 20 wt-% | of 1,2propyleneglycol |
| 77.5 wt-% | of water. |

TABLE 5

Examples 142–145

Compound 1 is a compound according to formula (I) or a mixture thereof.
Compound 2 is a dystuff named by its Colour Index name.

| Exp. | Compound 1 | wt-% of Compound 1 | Compound 2 | wt-% of Compound 2 |
|---|---|---|---|---|
| 142 | Example 1 | 80 | C.I. Acid Red 52 | 20 |
| 143 | Example 1 | 70 | C.I. Acid Red 289 | 30 |
| 144 | Example 47 | 80 | C.I. Acid Red 52 | 20 |
| 145 | Example 47 | 70 | C.I. Acid Red 289 | 30 |

All Examples (1–140) as well as the compounds according to formula (I) and mixtures thereof are suitable as Compound 1.
All compounds C.I. Acid Red compounds as well as mixtures thereof, which are listed in the description are suitable as Compound 2

Application Examples

Application Example A

An ink consisting of 2.5 parts of the mixture of Example 141 (dye mixture 1) in 97.5 parts of a mixture of water and 2-pyrrolidone where the ratio of water to N-methylpyrrolidone is 85:15 is introduced into an HP 880C DeskJet Printer and printed onto an A4 HP Premium Inkjet paper (HP and DeskJet are registered trademarks of Hewlett-Packard, Palo Alto, Calif., USA). The magenta prints thus obtained have good fastnesses.

This application example can be used in a similar manner for all the examples of the present application. Similarly, mixtures of individual dyes can be used. The prints thus obtained have good fastnesses.

Application Example B

An ink consisting of 2.5 parts of the mixture of Example 141 (dye mixture 1) in 97.5 parts of a mixture of water, propylene glycol and isopropanole where the ratio of water:propylene glycol and isopropylene is 90:5:5 is introduced into an HP 880C DeskJet Printer and printed onto an A4 HP Premium Inkjet paper (HP and DeskJet are registered trademarks of Hewlett-Packard, Palo Alto, Calif., USA). The magenta prints thus obtained have good fastnesses.

This application example can be used in a similar manner for all the examples of the present application. Similarly, mixtures of individual dyes can be used. The prints thus obtained have good fastnesses.

Application Example C

An ink consisting of 2.5 parts of Example 47 in 97.5 parts of a mixture of water and 2-pyrrolidone where the ratio of water to N-methylpyrrolidone is 85:15 is introduced into an HP 880C DeskJet Printer and printed onto an A4 HP Premium Inkjet paper (HP and DeskJet are registered trademarks of Hewlett-Packard, Palo Alto, Calif., USA). The magenta prints thus obtained have good fastnesses especially lightfastness and the colors is brilliant.

This application example can be used in a similar manner for all the examples of the present application. Similarly, mixtures of individual dyes can be used. The prints thus obtained have good fastnesses and the color is brilliant.

Application Example D

An ink consisting of 2.5 parts of Example 1 (Compound according to formula (XII)) in 97.5 parts of a mixture of water, propylene glycol and isopropanole where the ratio of water:propylene glycol and isopropylene is 90:5:5 is introduced into an HP 880C DeskJet Printer and printed onto an A4 HP Premium Inkjet paper (HP and DeskJet are registered trademarks of Hewlett-Packard, Palo Alto, Calif., USA). The magenta prints thus obtained have good fastnesses especially lightfastness and the color is brilliant.

This application example can be used in a similar manner for all the examples of the present application. Similarly, mixtures of individual dyes can be used. The prints thus obtained have good fastnesses and the colors is brilliant.

The invention claimed is:
1. A dyestuff of formula (I)

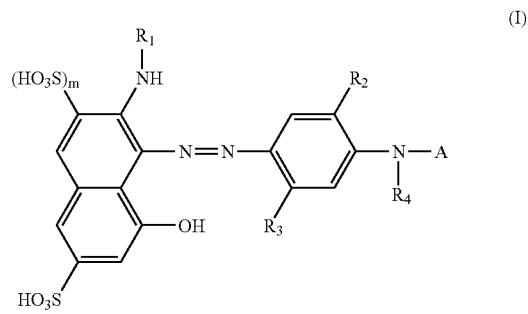

wherein
$R_1$ is H; $C_{1-4}$alkyl; substituted $C_{1-4}$alkyl; phenyl or substituted phenyl,
$R_2$ is H; $C_{1-4}$alkyl; substituted $C_{1-4}$alkyl; $C_{1-4}$alkoxy; —COOH; —COOCH$_3$; —CF$_3$; —SO$_3$H or —CN,
$R_3$ is H; $C_{1-4}$alkyl; substituted $C_{1-4}$alkyl; $C_{1-4}$alkoxy; —SO$_3$H; —CN; acetylamino; —OH; —CF$_3$ or —SO$_2$R$_5$,
wherein
$R_5$ is unsubstituted $C_{1-4}$alkyl or substituted $C_{1-4}$alkyl, $R_4$ is H; unsubstituted $C_{1-4}$alkyl or substituted $C_{1-4}$alkyl,
A is a radical of formula

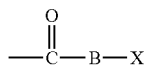

wherein
B is $C_{1-4}$alkylene,
X is —$SO_3H$ or —$SO_2R_5$ wherein
$R_5$ has the same meanings as defined above,
or A is a radical of formula —$SO_2R_6$,
wherein
$R_6$ is unsubstituted $C_{1-4}$alkyl; substituted $C_{1-4}$alkyl,
m is 0 or 1.

2. Dyestuff of formula (1) according to claim 1 wherein
$R_1$ is $C_{1-2}$alkyl; $C_{1-2}$alkyl which is substituted by —CN, halogen, or —COOH; phenyl or phenyl which is substituted by at least one substituent selected from the group consisting of $C_{1-2}$alkyl, $C_{1-2}$alkoxy, halogen, —$SO_3H$, —COOH, —OH and —CN,
$R_2$ is H; $C_{1-2}$alkyl; substituted $C_{1-2}$alkyl; $C_{1-2}$alkoxy; —COOH; —COOCH$_3$; —$SO_3H$ or —CN,
$R_3$ is H; $C_{1-2}$alkyl; substituted $C_{1-2}$alkyl; $C_{1-2}$alkoxy; —$SO_3H$; —CN; acetylamine; —OH or —$CF_3$,
$R_4$ is H or $C_{1-2}$alkyl,
A is a radical of formula

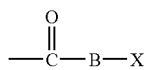

wherein
X is —$SO_3H$ or —$SO_2R_5$, wherein $R_5$ is $C_{1-2}$alkyl; substituted $C_{1-2}$alkyl; phenyl or substituted phenyl,
B is unsubstituted phenylene or $C_{1-4}$alkylene,
or A is a radical of formula —$SO_2R_6$,
wherein
$R_6$ is $C_{1-2}$alkyl; unsubstituted phenyl or phenyl which is substituted by $C_{1-2}$alkyl or $C_{1-2}$alkoxy, and
m is 0 or 1.

3. Dyestuff having the formula (Ia)

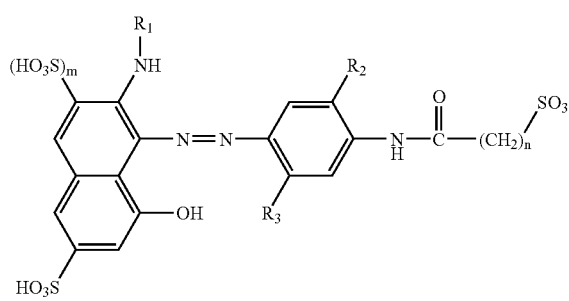

(Ia)

wherein
$R_1$ is H; —$CH_3$; —$CH_2CH_3$; substituted $C_2$-alkyl; phenyl; monosubstituted phenyl or disubstituted phenyl,
$R_2$ is H; —$OCH_3$; —COOH or —$COOCH_3$,
$R_3$ is H, —$SO_3H$; —CN; —$CF_3$; —$CH_3$; —$OCH_3$ or acetylamino,
m is 0 or 1, and
n is 1, 2 or 3.

4. Dyestuff having the formula (Ib)

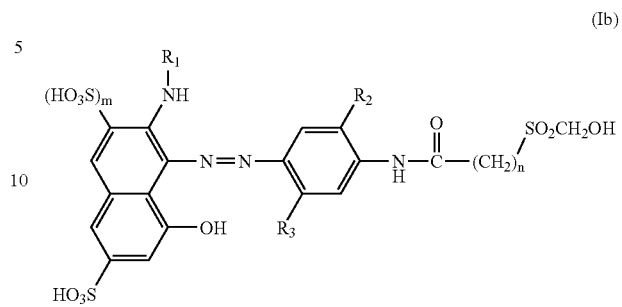

(Ib)

wherein
$R_1$ is H; —$CH_3$; —$CH_2CH_3$; substituted $C_2$-alkyl; phenyl; monosubstituted phenyl or disubstituted phenyl,
$R_2$ is H; —$OCH_3$; —COOH or —$COOCH_3$,
$R_3$ is H; —$SO_3H$; CN; —$CF_3$; —$CH_3$ or —$OCH_3$,
n is 1, 2 or 3
m is 0 or 1.

5. Dyestuff having the formula (Ic)

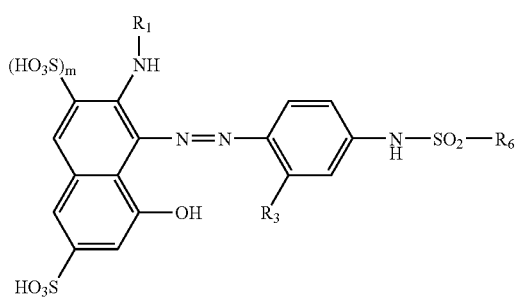

(Ic)

wherein
$R_1$ is —$CH_3$; —$CH_2CH_3$; substituted $C_2$-alkyl; phenyl; monosubstituted phenyl or disubstituted phenyl,
$R_3$ is H; —$SO_3H$; —CN; —$CF_3$; —$CH_3$ or —$OCH_3$,
$R_6$ is unsubstituted $C_{1-4}$alkyl; unsubstituted phenyl; monosubstituted phenyl or disubstituted phenyl,
m is 0 or 1.

6. A process for preparing a dyestuff comprising the steps of reacting a compound of formula (VII)

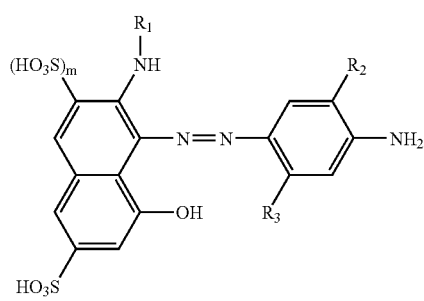

(VII)

with a compound of formula (VIIIa)

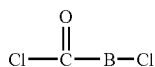
(VIIIa)

in H₂O/NaOH to form the compound of formula (IX); and reacting the compound of formula (IX)

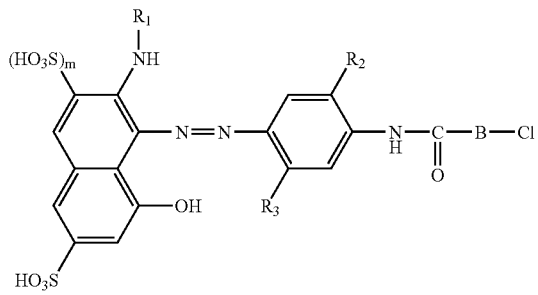
(IX)

with Na₂SO₃ or NaSO₂R₅ in an aqueous media to obtain a compound according to formula (I')

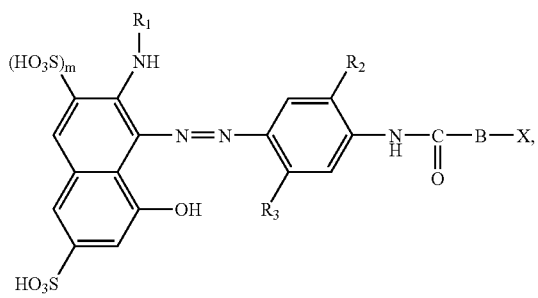
(I')

wherein
R₁ is H; C₁₋₄alkyl; substituted C₁₋₄alkyl; phenyl or substituted phenyl,
R₂ is H; C₁₋₄alkyl; substituted C₁₋₄alkyl; C₁₋₄alkoxy; —COOH; —COOCH₃; —CF₃; —SO₃H or —CN,
R₃ is H; C₁₋₄alkyl; substituted C₁₋₄alkyl; C₁₋₄alkoxy; —SO₃H; —CN; acetylamino; —OH; —CF₃ or —SO₂R₆,
wherein
R₅ is unsubstituted C₁₋₄alkyl or substituted C₁₋₄alkyl,
R₄ is H; unsubstituted C₁₋₄alkyl or substituted C₁₋₄alkyl,
A is a radical of formula

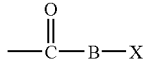

wherein
B is unsubstituted phenylene; substituted phenylene or C₁₋₄alkylene,
X is —SO₃H or —SO₂R₆ wherein
R₅ has the same meanings as defined above,
or A is a radical of formula —SO₂R₆,
wherein
R₆ is unsubstituted alkyl; substituted C₁₋₄alkyl; unsubstituted phenyl or substituted phenyl,
m is 0 or 1.

7. An Ink Jet Ink comprising at least one dyestuff according to claim 1.

8. An Ink Jet Ink according to claim 7, wherein the total content of salts is less than 0.5% by weight, based on the total weight of the dyes.

9. A recording material printed or dyed with at least one dyestuff of claim 1.

10. The printed recording material according to claim 9 wherein the recording material is paper or a papery substrate.

11. A recording material printed or dyed with a compound according to claim 5.

12. A dyestuff comprising the free acid form of a dyestuff according to claim 1.

13. A dyestuff comprising the salt form of a dyestuff according to claim 1.

14. A dyestuff combination comprising at least two dyestuffs according to claim 1.

15. The dyestuff combination according to claim 14, wherein the at least two dyestuffs are in a form selected from the group consisting of free acid, salt and mixtures thereof.

16. A process for preparing a dyestuff according to the formula (IC) of claim 5 comprising the step of reacting a compound of formula (VII)

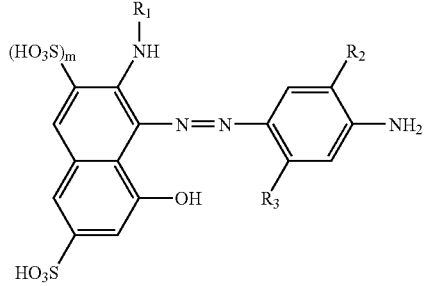
(VII)

wherein all substituents have the meanings as defined in claim 1, with a compound of (VIIIb)

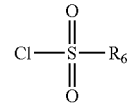
(VIIIb)

in H₂O/NaOH to form a compound of formula (Ic)

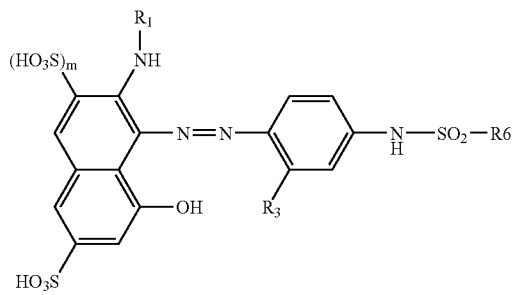
(Ic)

wherein all substituents have the same meaning as in claim 5.

17. Dyestuff having the formula (Ic)

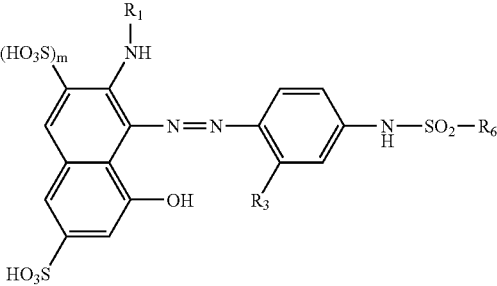
(Ic)

wherein
R₁ is H; —CH₃; —CH₂CH₃; substituted C₂-alkyl; phenyl; monosubstituted phenyl or disubstituted phenyl,
R₃ is H; —SO₃H; —CN; —CF₃; —CH₃ or —OCH₃,
R₆ is unsubstituted C₁₋₄alkyl,
m is 0 or 1.

* * * * *